(12) United States Patent
Scott et al.

(10) Patent No.: US 6,480,898 B1
(45) Date of Patent: Nov. 12, 2002

(54) SYSTEM, METHOD, AND COMPUTER PROGRAM PRODUCT FOR MANAGING A CARRIER EXCHANGE NETWORK

(75) Inventors: Mark Scott, Ashburn, VA (US); Row J. Zadeh, Louisville, KY (US)

(73) Assignee: Array Telecom Corporation, Herndon, VA (US)

( * ) Notice: Subject to any disclaimer, the term of this patent is extended or adjusted under 35 U.S.C. 154(b) by 0 days.

(21) Appl. No.: 09/393,288

(22) Filed: Sep. 10, 1999

(51) Int. Cl.[7] .............................................. G06F 15/16
(52) U.S. Cl. ..................... 709/238; 709/218; 709/227; 370/352
(58) Field of Search ............................... 709/238–245, 709/204, 206, 223, 205, 220, 218, 226, 228, 229, 227, 249–250; 370/400–401, 467–468, 351–356, 251, 474, 522

(56) References Cited

U.S. PATENT DOCUMENTS

| | | | | |
|---|---|---|---|---|
| 6,108,329 A | * | 8/2000 | Oyama et al. | 370/352 |
| 6,118,864 A | * | 9/2000 | Chang et al. | 379/225 |
| 6,161,008 A | * | 12/2000 | Lee et al. | 455/414 |
| 6,215,783 B1 | * | 4/2001 | Neyman | 370/353 |
| 6,341,127 B1 | * | 1/2002 | Kastube et al. | 370/352 |
| 6,341,311 B1 | * | 1/2002 | Smith et al. | 709/226 |

* cited by examiner

*Primary Examiner*—Ario Etienne
(74) *Attorney, Agent, or Firm*—Sterne, Kessler, Goldstein & Fox P.L.L.C

(57) ABSTRACT

A system, method, computer program product system for providing a carrier exchange (CX) backbone to a plurality of IP carriers to pass on their over-flow traffic to another participating carrier. The system and method offers a quality-based voice over Internet Protocol (VoIP) call routing management system with centralized call accounting. The system and method connects potentially incompatible IP networks (e.g., ATM, Frame Relay, etc.) to a single backbone operated by a CX provider. The barter-like system and method is mutually beneficial to all participants by providing low cost to originating gateways and additional revenue for terminating gateways in the form of increased minutes.

29 Claims, 3 Drawing Sheets

SYSTEM, METHOD, AND COMPUTER PROGRAM PRODUCT FOR MANAGING A CARRIER EXCHANGE NETWORK

BACKGROUND OF THE INVENTION

1. Field of the Invention

The present invention relates generally to Internet Protocol (IP) telephony networks and more particularly to the management of IP telephony networks using Internet-based protocols.

2. Related Art

In today's technological climate, the availability of low-cost computers, networking equipment, telecommunications, and related technology has dramatically changed the way people communicate. For example, the explosion of people connected to the global (sometimes referred to as the "public") Internet has dramatically increased the usage of electronic mail (e-mail) for communications, and the use of the browsers to navigate between and view (i.e., browse) documents through the World-Wide Web.

As is well known to those skilled in the relevant art(s), the global Internet is simply the world's largest internet—an interconnection of different computer networks. The Internet is thus a three-level hierarchy of networks which includes backbone, mid-level (transit),and stub networks. The backbone networks are high speed, digital or optical networks connected via network access points. Collectively, these networks form the public "Internet backbone." Further, these networks, which typically span across continents, were originally deployed by ARPA and NFS, are now deployed and operated by commercial entities such as AT&T, GTE, and Sprint. Mid-level networks, typically deployed and operated by regional Internet Service Providers (ISPs) or Internet Access Providers (IAPs) operate to connect stub networks to the Internet backbone. Stub networks are local enterprise-level networks operated by educational institutions, companies, organizations, and the like.

The connectivity achieved by the Internet—connecting numerous, different types of networks—is based upon a common protocol suite utilized by those computers connecting to it. Part of the common protocol suite is the Internet Protocol (IP), defined in Internet Standard (STD) 5, Request for Comments (RFC) 791 (Internet Architecture Board). IP is a network-level, packet (i.e., a unit of transmitted data) switching protocol. Another major part of the common protocol suite is the Transmission Control Protocol (TCP), which is defmed in STD 7, RFC 793. TCP is a transport-level, flow control protocol.

As is well-known in the relevant arts, TCP is used over IP (TCP/IP), and together ensure proper Internet communications. More specifically, IP separates data into packets (i.e., IP datagrams), addresses the IP datagrams, and forwards them from a source computer to a destination computer. Used in conjunction with IP, TCP holds open a path between the source and destination computers, acknowledges receipt of packets, re-sends lost packets, and guaranties correct packet order.

The User Datagram Protocol (UDP), which UDP is defined in STD 6, RFC 768, is another transport level protocol. UDP it typically used over IP (UDP/IP) and, similar to TCP/IP, allows for Internet communications. However, unlike TCP/IP, no connections need be established, and there is no guarantee of packet delivery. UDP/IP is the principal protocol used for real-time media transfer on the Internet.

Given the above, the use of Internet services, such as e-mail and browsers, are only the beginning in terms of means for people to communicate via the Internet. In recent years, the possibility of transmitting voice (i.e., audio) over the Internet has been recognized. Voice over IP (VoIP) began with computer scientists experimenting with exchanging voice using personal computers (PCs) equipped with microphones, speakers, and sound cards. This exchange employed UDP/IP over the public Internet.

In more recent years, an entire industry has evolved which primarily aims to provide cheap long-distance calls, using VoIP, that completely or partially bypasses the Public Service Telephone Network (PSTN) (also called the Plain Old Telephone System (POTS)). These services allow customers to use their standard telephones to place long distance and international calls, but still bypassing the PSTN. Several commercial VoIP carriers have emerged, offering businesses and consumers alike, telephone service over the public Internet or private IP networks.

VoIP was further facilitated when, in March of 1996, the International Telecommunications Union-Telecommunications sector (ITU-T), a United Nations organization, adopted the H.323 Internet Telephony Standard. Among its specifications, H.323 specifies the minimum standards (e.g., call setup and control) that equipment must meet in order to send voice over the IP, and other packet-switched network protocols where quality of sound cannot be guaranteed.

Most of the several emerging commercial VoIP carriers have chosen to build regional private IP backbones in order to provide VoIP services to their customers. This is because the public Internet is generally unreliable for providing quality point-to-point voice connections. That is, IP networks currently do not provide any universally deployed mechanisms for reserving bandwidth. This is compounded by the fact that the load on the public Internet is generally unpredictable. Any network congestion will result in loss or delayed packets, and thus low quality of sound (i.e., low-quality voice connection). Therefore, the aim of private IP networks is to provide an environment planned and operated in such a manner that guarantees an acceptable level of voice quality. As might be expected, the infrastructure cost to deploy and operational cost to manage an extensive private IP backbone network is not trivial. Thus, these private IP backbones are typically limited in geographic scope, thus limiting the commercial VoIP carriers from offering true low-cost, high quality call service between any two geographic locations. Consequently, recent efforts have focused on a carrier exchange (CX) service that would exchange traffic from various commercial VoIP carriers. The goal of a CX service is to eliminate the need for carriers trying to provide long distance (and international call) service to build IP telephony networks from scratch in all the geographic areas that they wished to service.

However, there are a number of shortcomings in terms of the capabilities provided by such CX services. First, the common network issue has not been addressed. That is, many CX service providers still require the use of the public Internet in order to connect to their networks. This may be both challenging and costly in certain geographic locations around the world. Some CX service organizations have built private backbone networks, but these networks typically cannot be readily extended to exchange traffic with other IP Telephony carriers. Second, there remains no way to guarantee a particular level of quality of service, other than requiring that all carriers exchanging traffic adhere to some minimum standard. Particularly where the Internet is used as the underlying communications network, it remains very difficult to be confident in the capability of other carriers to terminate calls at the correct level of quality.

Therefore, what is needed is a system, method, and computer program product which provides a quality-based voice over Internet Protocol routing CX management system. The system, method, and computer program product should allow connectivity of different types of networks operated by different carriers. The system, method, and computer program product should also provide each carrier participating in the CX management network with balance sheet calculating services in order for participants to fairly profit from the traffic they handle.

SUMMARY OF THE INVENTION

The present invention meets the above-mentioned needs by providing a system, method, and computer program product for managing a carrier exchange (CX) network.

A quality-based voice over Internet Protocol call routing system, according to an embodiment of the present invention, includes a plurality of CX proxy servers, each connected to the Internet Protocol (IP) backbone of one of the participating carriers, a CX IP backbone connected to the all of CX proxy servers, and a CX management system. The CX management system contains intelligence for routing VoIP traffic from the IP backbone of one of the participating carriers to the IP backbone of another of the participating carriers according to a pre-determined quality-based scheme.

The method of providing quality-based voice over Internet Protocol call routing, according to an embodiment of the present invention, includes the steps of using a first CX proxy server to receive VoIP traffic from the IP backbone of one of the participating carriers and then determining a destination IP backbone from among the participating carriers according to a pre-determined quality-based scheme. The method then routes the VoIP traffic to the CX proxy server associated and connected to the destination IP backbone, and then sends the VoIP traffic to the destination IP backbone.

One advantage of the present invention is that the CX network, by continuously monitoring all information regarding the quality of calls placed through the network, has the ability to manage quality of service.

Another advantage of the present invention is that each carrier participating in the CX Network will be capable of setting rules regarding the quality and cost requirements of calls that they are willing to authorize, both for inbound and for outbound traffic.

Another advantage of the present invention is that, for each participating carrier, call accounting and transaction recording is centrally maintained to allow the calculation of account balances.

Yet another advantage of the present invention is that a PSTN fallback scheme is implemented within the CX network, which is facilitated by a single gateway connected to a long distance switch capable of terminating traffic to any location in the world.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

TABLE OF CONTENTS

Figure 1:
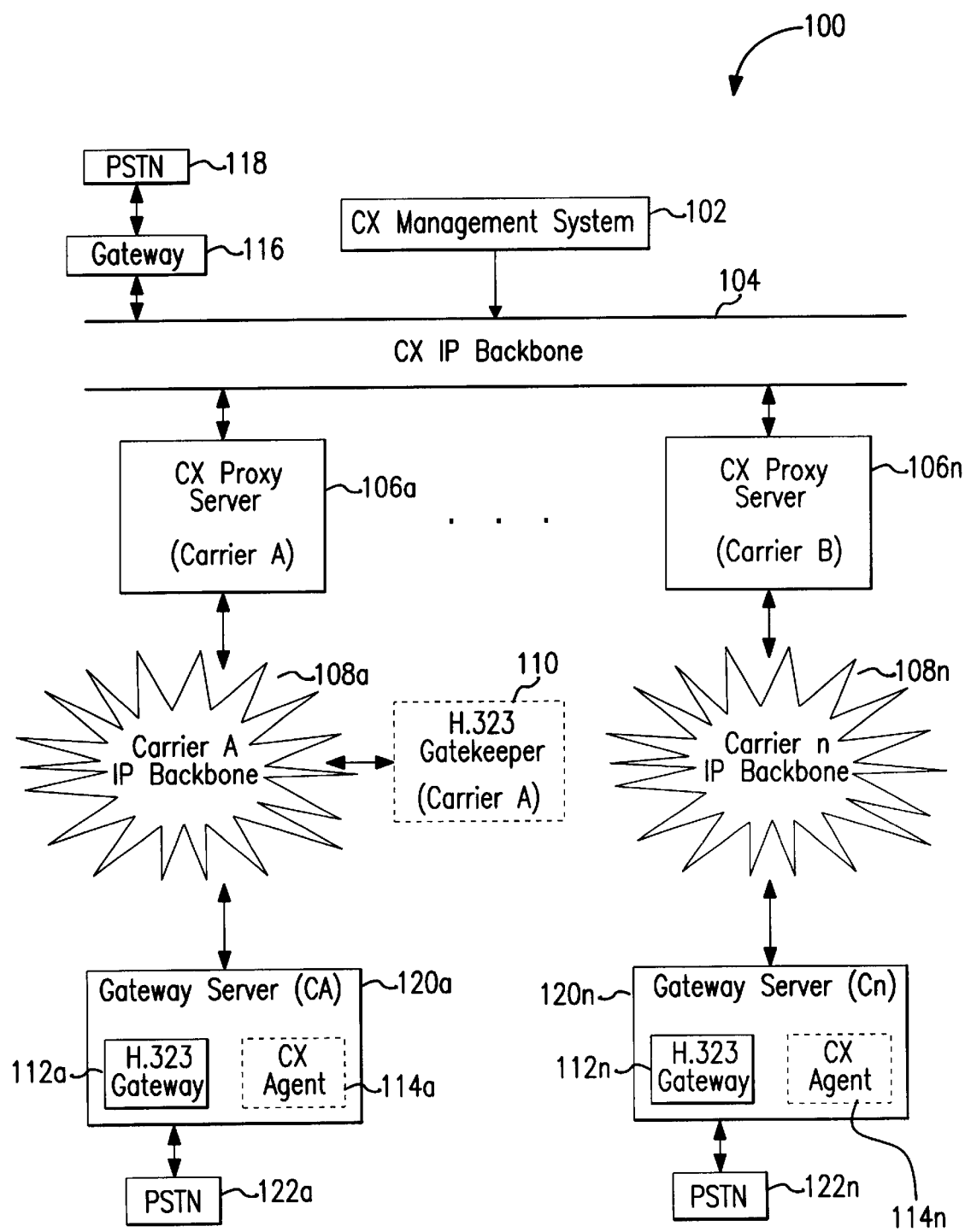
FIG. 1 is a block diagram illustrating the system architecture of an embodiment of the present invention, showing connectivity among the various components.

I. Overview
II. System Architecture
III. General System Operation
IV. General System Characteristics
   A. Quality of Service Management
   B. Rule-Based Call Authorization
   C. Centralized Call Accounting
   D. PSTN Fallback
   E. Realization of Business Opportunities
V. Example Implementations
VI. Conclusion

Overview

The present invention relates to a system, method, computer program product for managing a carrier exchange network. In a preferred embodiment of the present invention, a carrier exchange (CX) provider supplies the infrastructure (i.e., an IP CX network), protocol, agreement terms, and facilities so that regional commercial carriers can provide high-quality voice over IP (VoIP) services to their respective customers. The CX provider would also provide customer service, support, and billing as described herein.

Carriers that would participate in the CX network typically include Internet Service Providers (ISPs), Internet Access Providers (IAPs), or Internet Telephony Service Providers (ITSPs). ISPs and ITSPs who are unable to build a private IP backbone would thus connect to the IP CX network. Such an arrangement, at a minimum, guarantees each carrier participant the receipt of some terminating traffic.

More specifically, the CX provider establishes a managed IP backbone and allow customers (i.e., the regional carriers) to connect their networks to it. Each of these customers typically have limited coverage areas and is at the moment over-flowing a significant amount of their off-net traffic to the Public Service Telephone Network (PSTN). The benefit to each carrier would be to transfer that over-flow to another participating carrier (i.e., customer) of the IP CX Network. This will provide the participating carrier acting as the originating gateway operator with lower costs, and provide the participating carrier acting as the terminating gateway operator with additional revenues (i.e., more handled minutes).

The CX provider is capable of adding carriers as customers to the IP CX network backbone regardless of the carrier's IP Technology. The CX provider's role is to manage the entire IP CX network and to administer the transfer of minutes. Further, the CX provider is able to specify the quality requirements of each carrier and ensure transfer of calls only to gateways that meet the standards specified by the originating gateway.

The present invention is described in terms of the above example. This is for convenience only and is not intended to limit the application of the present invention. In fact, after reading the following description, it will be apparent to one skilled in the relevant art(s) how to implement the following invention in alternative embodiments (e.g., a packet traffic over-flow barter system for data, voice, video, or any integrated combination thereof).

The terms "carrier," "subscriber," "customer," "member," "participant," and the plural form of these terms may be used interchangeably throughout herein to refer to those who would access, use, or benefit from the management of the CX network of the present invention.

II. System Architecture

Referring to FIG. 1, a block diagram illustrating the system architecture of an embodiment of the present invention, showing connectivity among the various components, is shown. More specifically, FIG. 1 illustrates an Internet Protocol (IP) Carrier Exchange (CX) Network 100 (the "CX network 100" or "network 100"), according to an embodiment of the present invention.

CX network 100 includes a CX management system 102 which is connected to a CX IP backbone 104, which in turn, is connected to one or more CX proxy servers 106 (shown as CX proxy servers 106a–106n for ease of explanation). These components of the CX network 100, explained in more detail below, comprise the infrastructure a CX provider would make available to regional, commercial Voice over IP (VoIP) carriers in order to participate in the carrier exchange management system and method of the present invention. (Thus, the components of the CX network 100, as shown in FIG. 1, are divided into two regions using a dashed line.)

The CX management system 102 is a software component that provides code logic representing the intelligence to the CX network 100. It performs all call authorization, call routing, and call accounting functionality for calls that are placed using the CX network 100. It interfaces to each of the CX proxy servers 106 for each of the carriers participating in the CX network 100, and handles all calls that are placed through those CX proxy servers 106.

In an embodiment of the present invention, CX management system 102 software code contains significant redundancy and fault-tolerant requirements. Further, it is written in a high-level programming language (e.g., C, C++, or the like) executing on a workstation computer such as an IBM™ or compatible PC workstation running the Microsoft® Windows NT™ operating system.

The CX IP backbone 104 is used to carry all IP traffic between nodes (i.e., CX proxy servers 106) in CX network 100. This includes the traffic between carriers with different IP backbones. The CX proxy servers 106, described below, connect carriers participating in the CX provider's network 100 to the CX IP backbone 104.

In one embodiment of the present invention, the CX IP backbone 104 resides in one physical location and thus, is a local area network (LAN) such as a 100 megabits per second (Mbps) Ethernet LAN with Frame Relay or ATM connections to the carriers participating in the CX network 100. In an alternative embodiment, the CX IP backbone 104 covers a large geographical area, enabling inexpensive connection to the CX IP backbone 104 from many major cities. Thus, as will be apparent to one skilled in the relevant art(s), the CX IP backbone 104 would be a wide area network (WAN).

The CX proxy servers 106 serve as the bridges between the IP backbones 108 (shown as carrier backbones 108a–n for ease of explanation) deployed by the carriers participating in the CX network 100, and the CX IP backbone 104. The CX proxy servers 106 enable different IP addressing schemes to be used between the carriers and the CX IP backbone 104. That is, each CX proxy server 106 performs the translation between the IP addressing scheme that is used by its respective carrier, and a scheme that is compatible within the CX network 100.

In an embodiment of the present invention, the CX provider would supply one CX proxy server 106 to proxy traffic to and from each carrier subscriber of the CX network 100. In an alternative embodiment, a single CX proxy server 106 may be shared between multiple carriers, because it can manage multiple interfaces, and the bridging of traffic between those multiple interfaces.

The CX proxy servers 106 provide transparency to carriers participating in the CX network 100. Carriers will "see" the CX proxy server 106 as a single gateway capable of terminating all of its traffic, as well as a single source of incoming traffic. Once a carrier joins the CX network 100, incoming traffic from the CX proxy server 106 will actually be an aggregation of the traffic produced by the other carrier members in the CX network 100.

In an embodiment of the present invention, the CX proxy server 106 is a software component executing on a workstation running the Microsoft® Windows NT™ operating system, thereby using Windows NT™ for all IP datagram routing functionality.

In an embodiment of the present invention, the CX provider will have, as customers, participating carriers with existing IP backbones 108 in place (shown as carrier IP backbones 108a–n for ease of explanation). The CX proxy servers 106, described above, are used to connect these existing networks 108 to the CX IP Backbone 104. In an embodiment of the present invention, the plurality of existing carrier IP backbones can be part of the CX network 100 regardless of the underlying physical network. That is, the CX provider's CX proxy servers 106 can connect to various private IP networks such as Frame Relay networks, Asynchronous Transfer Mode (ATM) networks, point-to-point lease connection networks, and the like. Consequently, the CX proxy servers 106 would employ the carrier's protocol (e.g., H.323, etc.) to receive and transmit VoIP traffic to that carrier's network.

Some participating carriers may have an existing H.323 gatekeepers 110 deployed in their networks. As will be appreciated by one skilled in the relevant art(s), an H.323 gatekeeper refers to the H.323 standard's specification for the functions a network control server must perform in order to handle Internet Telephony. Joining the CX network 100 will not require the replacement of these gatekeepers 110. The H.323 gatekeeper is shown in FIG. 1 to indicate that the CX network 100 is intended to be compatible with H.323 environments where gatekeepers 110 are already present for authorizing and routing VoIP traffic. In such an environment, the gatekeeper 110 would be responsible for routing the appropriate calls to the CX proxy server 106 for the organization that owns the gatekeeper 110.

If the carrier for which traffic is being proxied already has an existing H.323 gatekeeper 110 deployed (such as Carrier A in FIG. 1), then the CX proxy server 106a will appear to be a foreign gatekeeper capable of terminating calls. Alternatively, if the carrier for which traffic is being proxied does not have an H.323 gatekeeper 110 (such as Carrier N in FIG. 1), then the CX proxy server 106n is capable of acting as an H.323 gatekeeper for the gateway server 120 in that carrier network.

Each of the carriers employ a gateway server (i.e., a point of presence) 120 (shown as gateways servers 120a–n for ease of explanation) where their respective IP backbone 108 is accessible to their customers via the local PSTN 122 (shown as PSTN 122a–n for ease of explanation). The gateway servers 120 are the fundamental elements that the CX network 100 provides a means of communication between. In an embodiment of the present invention, the gateway servers 120 in the CX network 100 adhere to a common protocol (e.g., H.323) and thus include a H.323 gateway 112 (shown as H.323 gateways 112a–n for ease of explanation).

In an embodiment of the present invention, in addition to providing H.323 gateway 112 functionality, the gateway servers 120 may additionally embed a CX agent 114 (shown as CX agent 114a–n for ease of explanation). The CX agent 114 is an optional software code logic that can be embedded into each gateway server 120 operated by carriers participating in the CX network 100.

The primary purpose of the CX agent 114 is to enable real-time measurements of quality of service (QoS) in a more accurate way than is possibly through such standards as H.323. The CX agent 114 can also assist in determining if a particular gateway server 120 is functional. In an embodiment of the present invention, the CX agent 114 may collect quality data about each carrier's network on a pre-determined time interval using "fake" test packets (e.g., every 30 minutes) and/or when an actual VoIP call is being originated or terminated using actual packets.

In an embodiment of the present invention, the CX agent 114 is a software component executing on a workstation computer such an IBM™ or compatible PC workstation running the Microsoft® Windows NT™ operating system. In an alternative embodiment, it may execute on a workstation running the Unix operating system.

The CX agent 114 is not a required component, because the network 100 can be functional without it. QoS, however, is more manageable by the CX management system 102 if a CX agent 114 is present on each gateway server 120. The CX agent 114 is an optional component due to the fact that it may not to be able to be deployed on every gateway server 120. For example, a carrier involved in the CX network 100 may utilize gateway products (e.g., certain vendor's routers) that do not allow additional software components, such as the CX agent 114, to be added.

As will be apparent to one skilled in the relevant art(s), the connections among the components in CX network 100 can be Integrated Services Digital Network (ISDN) T-1 or T-3 lines, Synchronous Optical Network (SONET) OC-1 or OC-3 lines, or the like. Further, the CX provider would employ a gateway 116 which is connected to the local PSTN 118 for implementation of a PSTN fallback scheme as explained in detail below.

III. General System Operation

Figure 2:
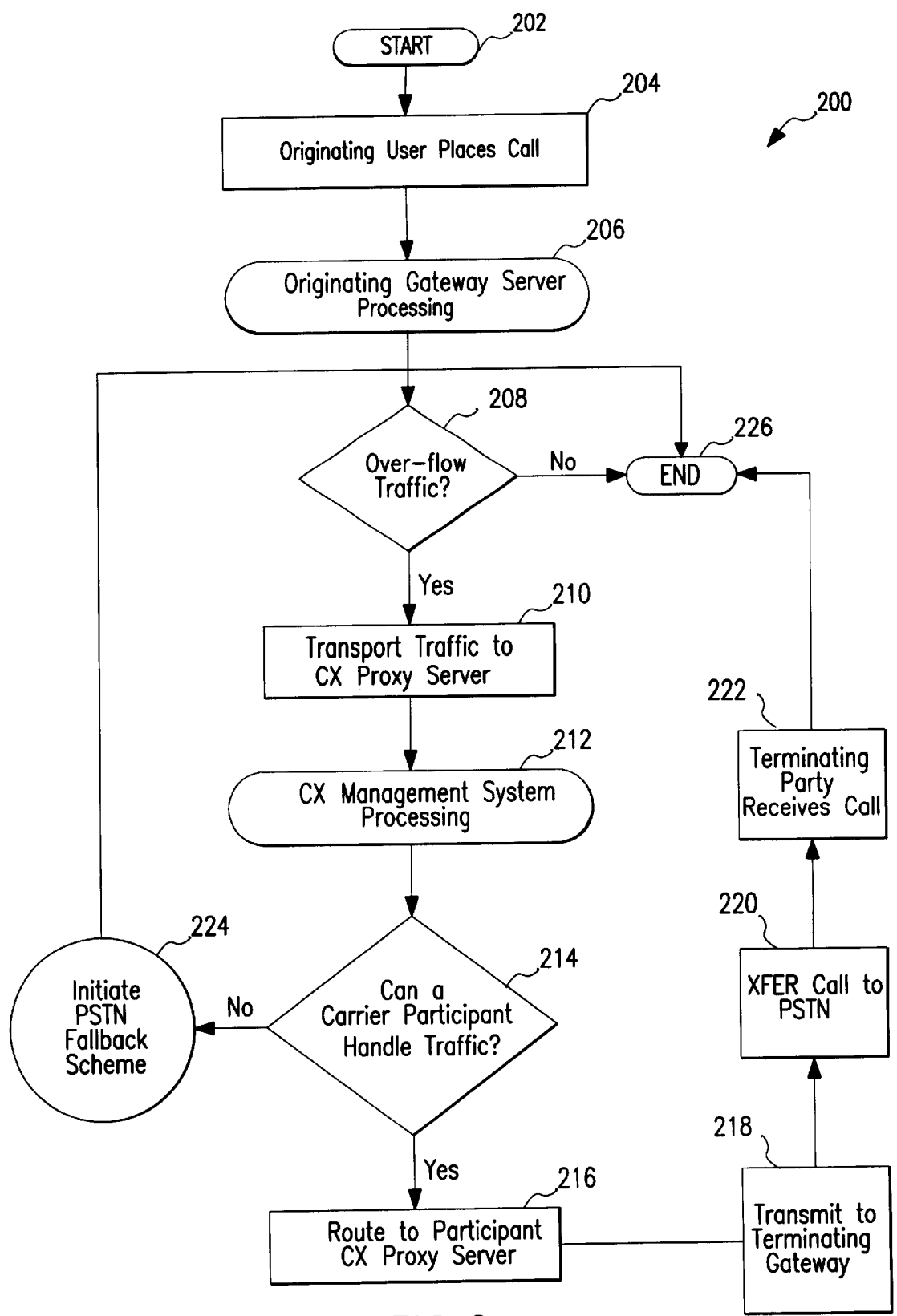
FIG. 2 is a flowchart representing the general operational flow according to an embodiment of the present invention.

Referring to FIG. 2, a flowchart 200 representing the general operational flow, according to an embodiment of the present invention, is shown. More specifically, flowchart 200 depicts an example control flow (while specifying the various components) involved in exchanging VoIP traffic over CX network 100. Flowchart 200 begins at step 202 with control passing immediately to step 204.

In step 204, a subscriber located in the geographic area serviced by Carrier A's VoIP services may use standard telephone equipment and, via the local PSTN 122a, access Carrier A's gateway server 120a. Thus, gateway server 120a is the originating gateway. The user may be in, for example, Los Angeles, and desire to place a VoIP long distance call to New York.

In step 206, gateway server 120a processes the analog voice data into digital signals in a well-known manner that will be apparent to one skilled in the relevant art(s). Then, in step 208, the gateway server 120a determines if it can terminate the call within its private IP network served by its IP backbone 108a. If the carrier is a regional carrier providing service only to, for example, the western region of the United States, step 208 determines the traffic to be over-flow traffic. Flowchart 200 then proceeds to step 210.

Alternatively, if step 208 determined that the traffic is not over-flow (i.e., the caller wishes to call an area covered by Carrier A's IP backbone 108a, for example, Seattle), the control flow of flowchart 200 would then end as indicated by step 226.

In step 210, the traffic being determined to be over-flow, the traffic is forwarded by the gateway 120a, via the IP backbone 108a, to CX proxy server 106a. In this instance, gateway 120a would regard CX proxy server 106a as the terminating gateway for the instant call. In step 212, the CX management system 102 would process the traffic to determine a destination gateway server 120 from among the carriers subscribers according to a pre-determined quality-based scheme (explained below).

In step 214, the CX management system 102 determines whether any other subscriber member of CX network 100 can adequately complete the call. If, for example, the CX management system 102 determines that the quality of Carrier N's network was acceptable to it and/or Carrier A, and such other factors as Carrier N's geographic coverage (i.e., Carrier N has a point of presence in New York), cost, etc. are acceptable, it will be chosen. Then, in step 216, the traffic is routed from CX proxy server 106a, via the CX IP backbone 104, to the CX proxy server 106n connected to Carrier N's IP backbone 108n.

In step 218, the CX proxy server 106n routes the traffic, via Carrier N's IP backbone 108n, to gateway server 120n. Thus, gateway 120n is the terminating gateway for the user's call. In step 220, gateway server utilizes the PSTN 122n to place a local call to terminate the call. The terminating (i.e., called) party in New York, in step 222, then receives the call from originating party in Los Angeles. The control flow of flowchart 200 would then end as indicated by step 226.

Returning to step 214, if the CX management system 102 determines that none of the other subscriber members of the CX network 100 can adequately complete the call, flowchart 200 proceeds to step 244. In step 224, the CX management system 102 utilizes gateway 116 to place a high-quality call over its local PSTN 118 to terminate the call as part of a "PSTN fallback" scheme. The control flow of flowchart 200 would then end as indicated by step 226.

IV. General System Characteristics

Given the above description, the following features and advantages (i.e., characteristics) of the present invention are further highlighted.

A. Quality of Service Management

An important aspect of the CX network 100 is the ability to manage QoS. Because CX proxy servers 106 handle all calls placed through the CX network 100, all information regarding the quality of calls placed through the network 100 can be continuously monitored by the CX management system 102. The CX management system 102 can use this data to assign quality of service indications to each of the gateway servers 120 that participate in the CX network 100. Furthermore, the use of the CX agents 114 permits a prediction of call quality to be made prior to the actual establishment of any call. Thus, selection between multiple possible alternatives based on current quality conditions is feasible.

In an embodiment of the present invention, a pre-determined quality-based scheme is employed by the CX management system. For example, in determining routing (steps 212–214 of FIG. 2) a five-point system can be utilized to ultimately determine a QoS indicator. That is, a one (1) would signify the highest quality (like a PSTN) and a five (5) would signify the lowest quality. Thus, for each measurement that comprises QoS—packet loss, delay time, order of packets, and jitter (the random variation in the delivery time for packets)—a one (1) to five (5) can be assigned. Consequently, for each carrier network evaluated by the CX management system 102 and/or the CX agents 114, the higher score achieved by a carrier, the lower its quality.

B. Rule-Based Call Authorization

Each carrier participating in the CX network 100 is capable of setting rules regarding the calls that they are willing to authorize. This is true for both inbound and outbound traffic. An important aspect of this capability is that each carrier can specify quality and cost requirements for all calls that they wish to terminate via the CX network 100. In an embodiment of the present invention, these carriers' rules augment the five-point QoS scheme explained above.

Furthermore, a carrier can specify the calls that it is willing to terminate, and the cost for terminating those calls. The information supplied by a carrier regarding the calls it is willing to terminate will be combined with quality information obtained about that carriers network. This allows the CX management system 102 to determine if calls requested by other carriers can be terminating using any other carrier's network.

Such a rule-based call authorization does not allow low-quality participants in the CX network 100 to disrupt the level of service provided by the network 100 as a whole. The rule-based call authorization scheme, however, still enables low-quality carrier participants to terminate traffic through other carriers in the network 100.

C. Centralized Call Accounting

The CX management system 102 performs all call accounting and transaction recording. One aspect of this feature is the automatic maintenance of accounting information for each carrier participating in the CX network 100. Rather than force the CX network 100 members to deal with each other for all calls terminated during a certain period of time, the CX network 100 provider is the only central entity with whom carriers have to deal with directly.

It is important to note that the CX network 100 provider need not provide call termination costs that are exactly equal to the call termination costs supplied by its representative carriers. Instead, the CX network 100 provider can sell minutes to a particular area for the cost of those minutes, plus a processing/overhead fee. These fees, ultimately, pay for the operation of the CX network 100. The CX management system 102 incorporates software code logic to automatically compute these transactions, and manage the account balances of all carriers involved in the CX network 100.

D. PSTN Fallback

The carrier-selection model described above facilitates the implementation of a PSTN fallback scheme. A single gateway, gateway 116, is connected to a long distance switch within PSTN 118 that is capable of terminating traffic to any location in the world. By setting the termination costs to each of those areas equal to the costs provided by the traditional long distance carrier to which the gateway 116 is connected, it is possible to provide termination to all areas not directly covered by the IP CX network 100. This also guarantees that if the quality of network 100 deteriorates to a particular (pre-determined) level, it will still be possible to ensure that a call can be terminated with high quality because PSTN fallback is always possible.

Furthermore, by terminating traffic from an area where inexpensive long distance is available (such as the United States), international carrier members may realize cost reductions even where one leg of a handled call is a traditional long distance call. For example, a carrier can terminate calls going to North America, South America, and Europe, by using a gateway 116 connected to a long distance switch in the United States.

E. Realization of Business Opportunities

By generating sufficient traffic on the IP CX network 100, the CX provider can seize an opportunity to realize new business. The CX network 100 will provide complete data on each area that users call, and the amount that is being charged by members of the CX network 100 for call termination to those areas. Because one of the termination mechanisms will ultimately be via the PSTN 118, and described above, it may be possible to realize business opportunities for the deployment of additional IP gateways 120 in certain areas.

The above is illustrated by the following example. The CX management system 102 may collect data indicating that two million minutes of over-flow traffic per month is being terminated into a particular area of the world. The rate for such termination is noticed to be 30 cents per minute using a wholesale long distance provider. If an IP telephony gateway 120 deployment could terminate the same traffic at a cost of 10 cents per minute and a sale price of 25 cents per minute is charged, this would result in a monthly income of $300,000 (15 cents/minute multiplied by 2 million minutes). This can then be used as a mechanism to determine where sales of IP gateway products are needed. A carrier can then enter the identified market and be guaranteed a particular amount of traffic if they purchase and deploy a new gateway 120 in the particular area of the world identified. Alternatively, the CX provider could directly deploy a new gateway 120 in those identified areas for the purpose of increasing revenue and profit.

V. Example Implementations

The present invention (i.e., CX network 100 or any part thereof) may be implemented using hardware, software or a combination thereof and may be implemented in one or more computer systems or other processing systems. In fact, in one embodiment, the invention is directed toward one or more computer systems capable of carrying out the functionality described herein.

Figure 3:
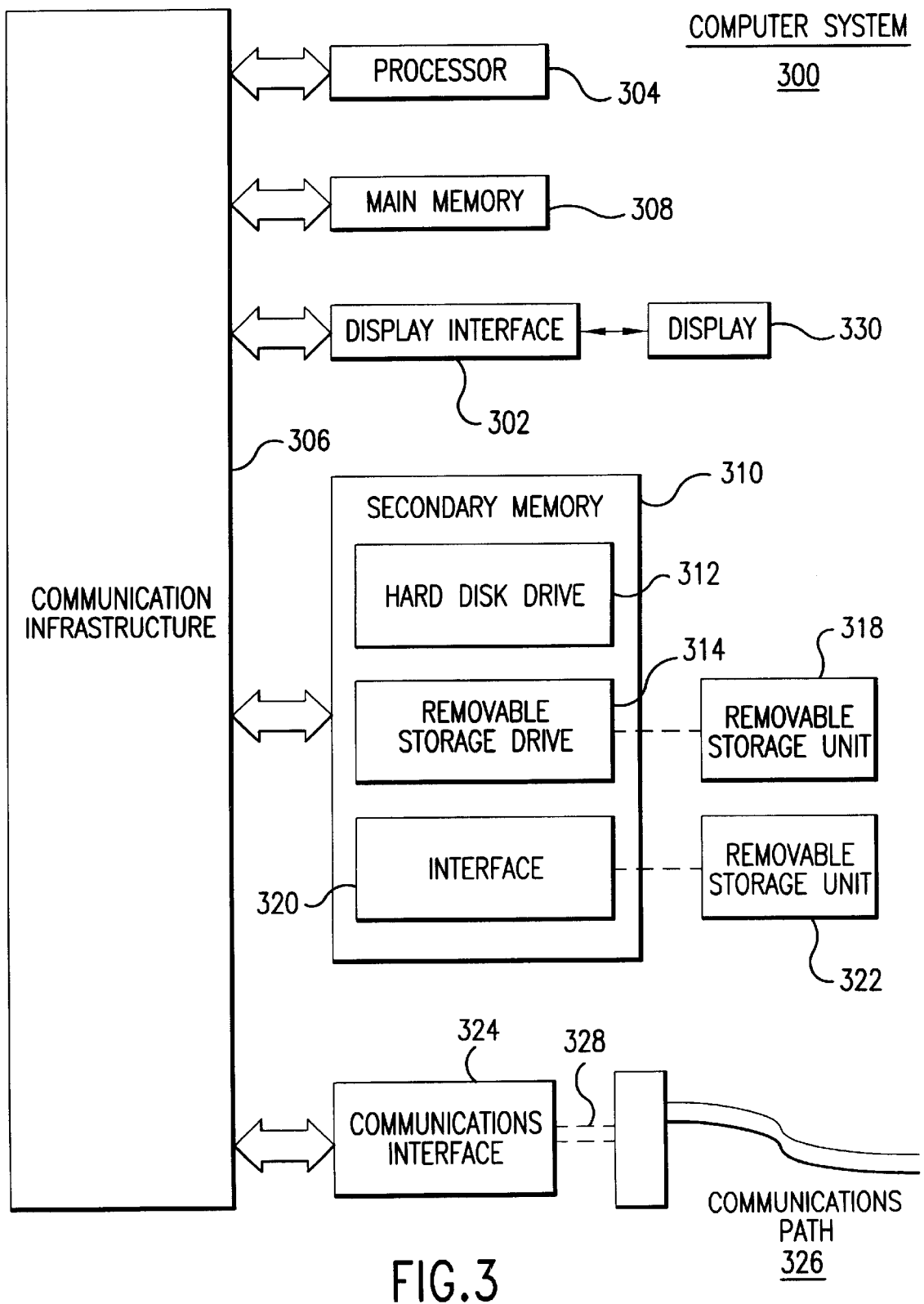
FIG. 3 is a block diagram of an example computer system useful for implementing the present invention.

Referring to FIG. 3, an example computer system 300 useful in implementing the present invention is shown. The computer system 300 includes one or more processors, such as processor 304. The processor 304 is connected to a communication infrastructure 306 (e.g., a communications bus, cross-over bar, or network). Various software embodiments are described in terms of this exemplary computer system. After reading this description, it will become apparent to a person skilled in the relevant art how to implement the invention using other computer systems and/or computer architectures.

Computer system 300 can include a display interface 305 that forwards graphics, text, and other data from the communication infrastructure 302 (or from a frame buffer not shown) for display on the display unit 330.

Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well-known manner. Removable storage unit 318, represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar means for allowing computer programs or other instructions to be loaded into computer system 300. Such means may include, for example, a removable storage unit 322 and an interface 320. Examples of such may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a PCM-CIA slot and card, etc. Software and data transferred via communications interface 324 are in the form of signals 328 which may be electronic, electromagnetic, optical or other signals capable of being received by communications interface 324. These signals 328 are provided to communications interface 324 via a communications path (i.e., channel) 326. This channel 326 carries signals 328 and may be implemented using wire or cable, fiber optics, a phone line, a cellular phone link, an RF link and other communications channels.

In this document, the terms "computer program medium" and "computer usable medium" are used to generally refer to media such as removable storage drive 314, a hard disk installed in hard disk drive 312, and signals 328. These computer program products are means for providing software to computer system 300. The invention is directed to such computer program products.

Computer programs (also called computer control logic) are stored in main memory 308 and/or secondary memory 310. Computer programs may also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for providing quality-based voice over Internet Protocol (VoIP) routing among the Internet Protocol (IP) backbones of a plurality of carriers, comprising the steps of:
   (1) receiving at a first CX proxy server a VoIP call from the IP backbone of one of the plurality of carriers;
   (2) determining a destination IP backbone from among the plurality of carriers according to a pre-determined quality-based scheme;
   (3) routing said VoIP call to a second CX proxy server connected to said destination IP backbone; and
   (4) sending, by said second CX proxy server, said VoIP call to said destination IP backbone.

2. The method of claim 1, further comprising the step of routing said VoIP call to a gateway connected to a Public Service Telephone Network when said pre-determined quality-based scheme determines that none of the plurality of carriers is a suitable destination.

3. The method of claim 1, wherein said pre-determined quality-based scheme comprises the step of setting rules regarding calls willing to be authorized by each one of the plurality of carriers.

4. The method of claim 1, wherein said pre-determined quality-based scheme comprises the step of utilizing a five-point system to determine a Quality of Service (QoS) indicator.

5. The method of claim 4, further comprising the step of setting rules regarding calls willing to be authorized by each one of the plurality of carriers.

6. The method of claim 5, wherein the step of setting rules specifies cost requirements for calls to be terminated via a CX network.

7. The method of claim 6, wherein the step of setting rules further includes the step of specifying quality requirements for calls to be terminated via said CX network.

8. The method of claim 7, further including the step of specifying at least one call that a carrier is willing to terminate.

9. The method of claim 8, further including the step of specifying a cost for terminating said at least one call.

10. The method of claim 9 further comprising the step of determining whether a call requested by one carrier can be terminated using another carrier's network.

11. The method of claim 10, wherein said determining step occurs by combining said rules regarding said calls willing to be authorized by a carrier with quality information about said carrier's network.

12. A carrier exchange (CX) network for providing quality-based voice over Internet Protocol (VoIP) routing among a plurality of carriers, comprising:
   a plurality of CX proxy servers, wherein each of said CX proxy servers is connected to the Internet Protocol (IP) backbone of one of the plurality of carriers;
   a CX IP backbone connected to said plurality of CX proxy servers, wherein said CX IP backbone receives VoIP traffic from said plurality of CX proxy servers; and
   a CX management system, connected to said CX IP backbone that routes VoIP traffic from the IP backbone of one of the plurality of carriers to the IP backbone of another of the plurality of carriers according to a pre-determined quality-based scheme.

13. The CX network of claim 12, wherein said pre-determined quality-based scheme comprises rules regarding calls willing to be authorized by each one of the plurality of carriers.

14. The CX network of claim 12, wherein said pre-determined quality-based scheme comprises a five-point system to determine a Quality of Service (QoS) indicator.

15. The CX network of claim 14, wherein said pre-determined quality-based scheme further comprises rules regarding calls willing to be authorized by each one of the plurality of carriers.

16. The CX network of claim 15, wherein said rules include cost requirements for calls to be terminated via the CX network.

17. The CX network of claim 16, wherein said rules further include quality requirements for calls to be terminated via the CX network.

18. The CX network of claim 17, wherein said quality requirements include identification of at least one call that a carrier is willing to terminate.

19. The CX network of claim 18, wherein said quality requirements include cost for terminating said at least one call.

20. The CX network of claim 12, further comprising a gateway, connected to a Public Service Telephone Network, for receiving said VoIP traffic when said pre-determined quality-based scheme determines that none of the plurality of carriers is a suitable destination.

21. A computer program product comprising a computer usable medium having control logic stored therein for causing a computer to provide quality-based voice over Internet Protocol (VoIP) routing among the Internet Protocol (IP) backbones of a plurality of carriers, said control logic comprising:
   a first computer readable program code means for causing the computer to receive a VoIP call from a first CX proxy server connected to a source IP backbone;
   a second computer readable program code means for causing the computer to determine a destination IP backbone from among the plurality of carriers according to a pre-determined quality-based scheme; and
   a third computer readable program code means for causing the computer to route said VoIP call to a second CX proxy server connected to said destination IP backbone;
   whereby said second CX proxy server sends said VoIP call to said destination IP backbone.

22. The computer program product of claim 21, further comprising a fifth computer readable program code means for causing the computer to route said VoIP call to a gateway connected to a Public Service Telephone Network when said pre-determined quality-based scheme determines that none of the plurality of carriers is a suitable destination.

23. The computer program product of claim 21, wherein said pre-determined quality-based scheme comprises rules regarding calls willing to be authorized by each one of the plurality of carriers.

24. The computer program product of claim 21, wherein said pre-determined quality-based scheme comprises a five-point system to determine a Quality of Service (QoS) indicator.

25. The computer program product of claim 24, wherein said pre-determined quality-based scheme further comprises rules regarding calls willing to be authorized by each one of the plurality of carriers.

26. The computer program product of claim 25, wherein said rules include cost requirements for calls to be terminated via the CX network.

27. The computer program product of claim 26, wherein said rules further include quality requirements for calls to be terminated via the CX network.

28. The computer program product of claim 27, wherein said quality requirements include identification of at least one call that a carrier is willing to terminate.

29. The computer program product of claim 28, wherein said quality requirements include cost for terminating said at least one call.

* * * * *